ns Patent [19]

United Stat
Mori

[11] 3,814,081
[45] June 4, 1974

[54] OPTICAL MEASURING CATHETER
[75] Inventor: Toshiyuki Mori, Tokyo, Japan
[73] Assignee: Olympus Optical Co., Ltd., Tokyo, Japan
[22] Filed: Mar. 30, 1972
[21] Appl. No.: 239,693

[30] Foreign Application Priority Data
Apr. 2, 1971 Japan.............................. 46-24593
Apr. 2, 1971 Japan.............................. 46-24594
Apr. 2, 1971 Japan.............................. 46-24595
Apr. 2, 1971 Japan.............................. 46-24597
May 10, 1971 Japan............................. 46-37204

[52] U.S. Cl. ......... 128/2 L, 128/2.05 D, 350/96 B, 356/41
[51] Int. Cl................................. A61b 5/02
[58] Field of Search....... 128/2 R, 2 L, 2 M, 2.05 R, 128/2.05 D, 2.05 F, 4–8, 348, 349 B; 350/96 B; 356/41

[56] References Cited
UNITED STATES PATENTS
3,273,447  9/1966  Frank........................ 128/2.05 D X
3,335,715  8/1967  Hugenholtz et al................. 128/2 L
3,417,745  12/1968 Sheldon ................................ 128/6
3,461,856  8/1969  Polanyi....................... 128/2 L 3,690,769  9/1972  Mori..................................... 356/41

*Primary Examiner*—Dalton L. Truluck
*Attorney, Agent, or Firm*—Hans Berman

[57]  ABSTRACT

Optical measuring catheter for measuring the degree of oxygen saturation in the blood of a living body utilizing an illuminating fiber optical system and a light receiving fiber optical system arranged closely along each other the forward ends of which are adapted to be inserted together into an organ of the living body in which the blood is flowing. By supplying light having a wave length of about 600 – 750 m$\mu$ or light having a wave length of about 800 m$\mu$ to the illuminating fiber optical system, the degree of oxygen saturation in the blood is determined by the light incident to the blood and reflected thereby so as to be received by the light receiving fiber optical system due to the fact that the absorption spectrum of Hb is different from that of HbO$_2$. The optical measuring catheter comprises an optical member attached to the forward ends of the fiber optical systems for preventing the forward ends from directly contacting the inner wall of the organ into which the forward ends are inserted while insuring the optical communication of the forward ends with the exterior of the optical member.

2 Claims, 27 Drawing Figures

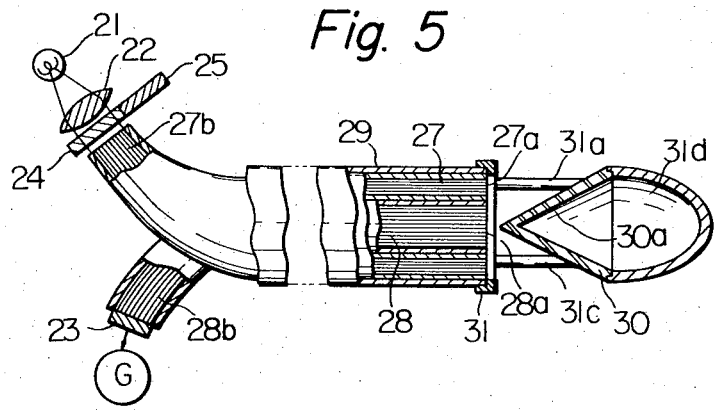
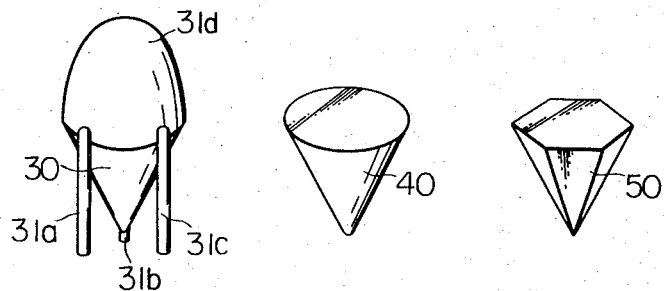
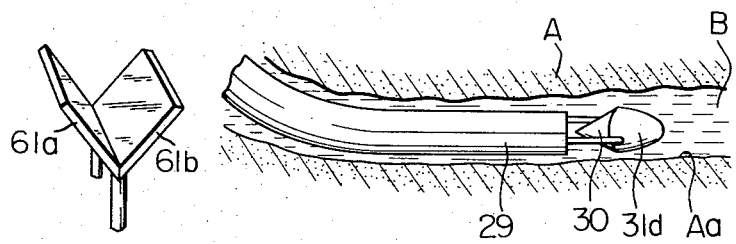

PATENTED JUN 4 1974    3,814,081
SHEET 3 OF 5
Fig. 11
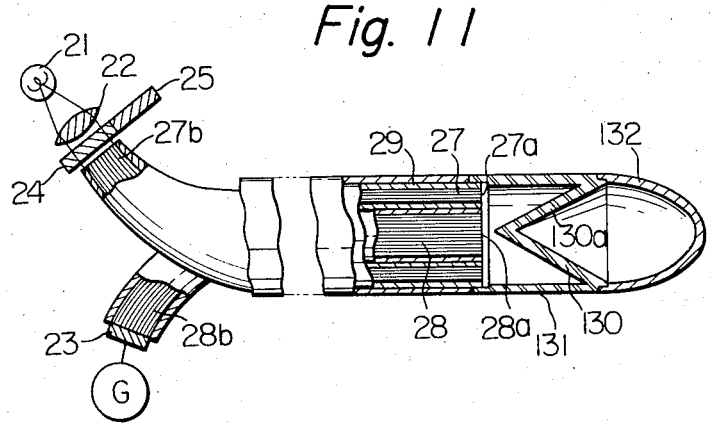
Fig. 12   Fig. 13   Fig. 14
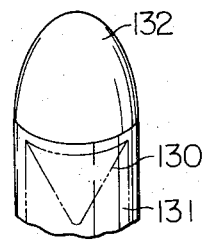   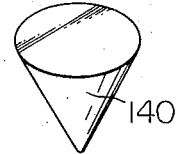   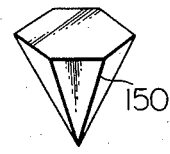
Fig. 15   Fig. 16
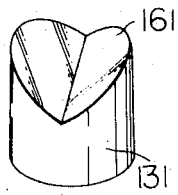   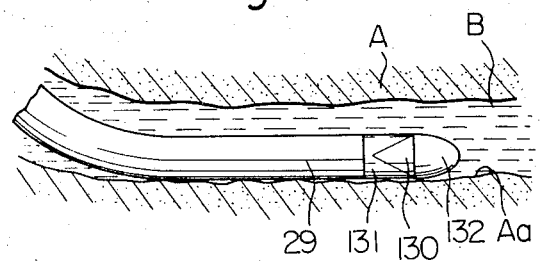

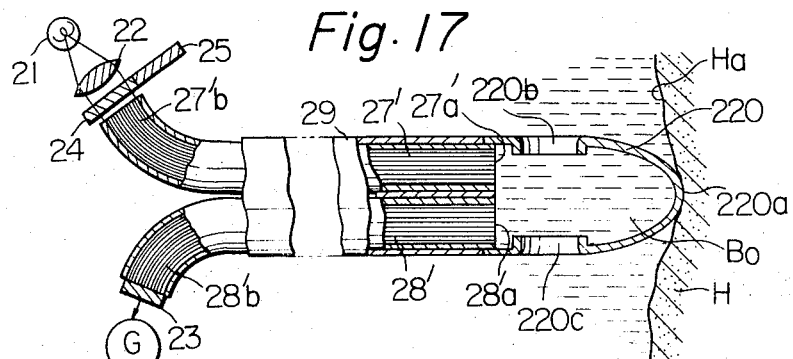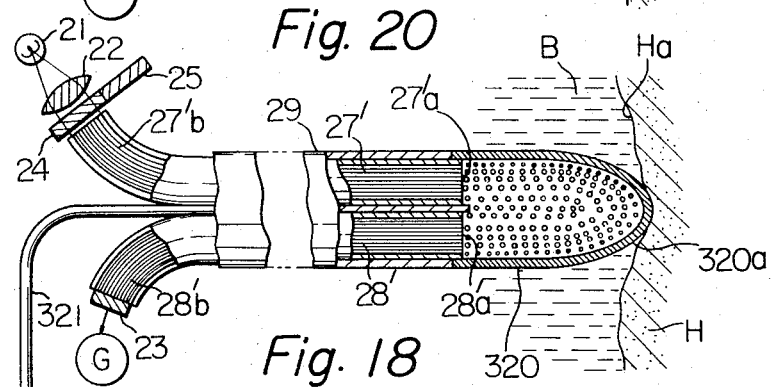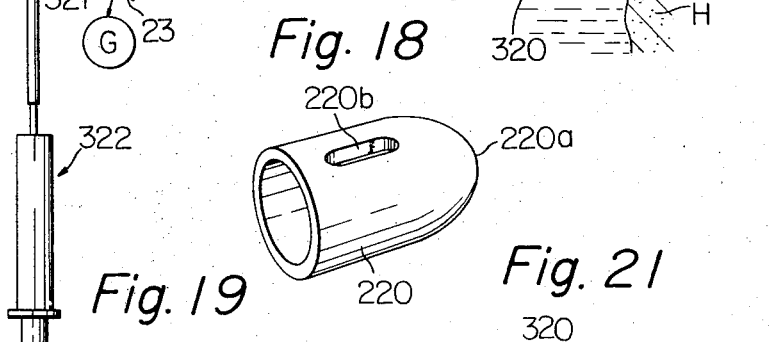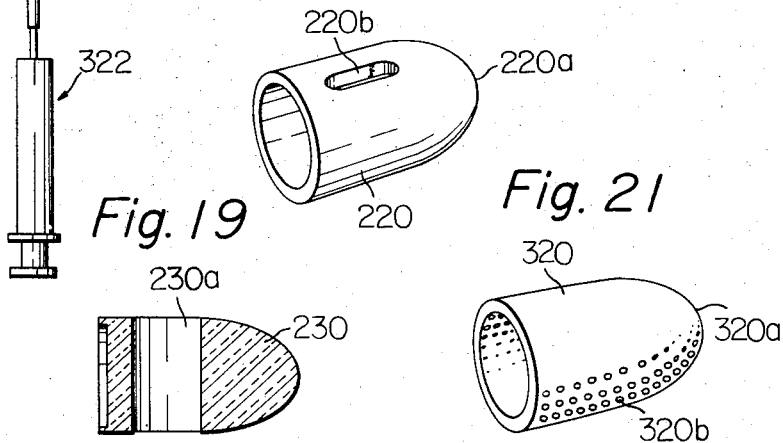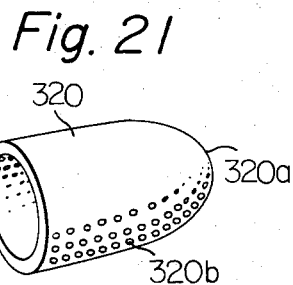

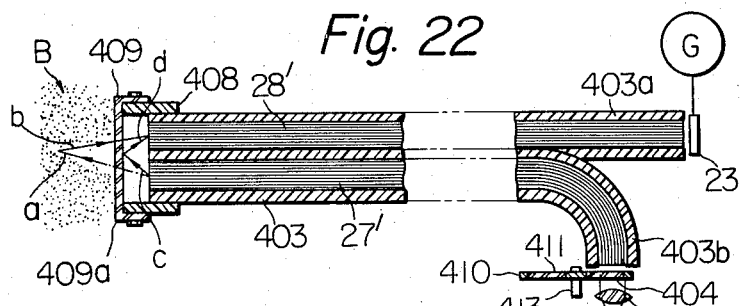

OPTICAL MEASURING CATHETER

BACKGROUND OF THE INVENTION

The present invention relates to an optical measuring catheter and, more particularly, to an optical measuring catheter for measuring the degree of oxygen saturation in the blood of a living body and the blood pressure as well as the variation thereof.

The degree of oxygen saturation in the blood is measured in order to find out the degree of conversion of reduced hemoglobin (Hb) into oxidized hemoglobin ($HbO_2$) by the lungs of a living body. In the conventional cuvette system blood is taken out from the living body for the direct measurement of the degree of oxygen. High skill is required for the measurement while a long time is required until the result is obtained, although the result is accurate, and the living body might be harmed when the blood is taken out for the measurement.

In order to avoid the above disadvantages, another method has been proposed which is called the earpiece system in which the measuring device is attached to the ear lobe of the living body, and the light passing through the blood flowing in the lobe is determined. However, compensation for the thickness of the lobe, the quantity of the blood flowing in the lobe, and the color of the skin of the lobe is required thereby making the measurement very troublesome.

A further method has been proposed to avoid the above described difficulties. This method utilizes an illuminating fiber optical system and a light receiving fiber optical system arranged closely in parallel to each other with the forward ends being flush with each other. The forward end portions are inserted into a blood vessel or into the heart of the living body. A light source and a condenser lens are arranged at the rear end of the illuminating fiber optical system so as to supply the light thereto, while a photoelectric element is attached to the rear end of the light receiving fiber optical system and a galvanometer is connected to the photoelectric element, so that the light emanating from the forward end of the illuminating fiber optical system is reflected by the blood and received by the light receiving fiber optical system so as to generate an output in the photoelectric element to actuate the galvanometer. An R type filter passing only light having wave lengths of about 600 – 750 m$\mu$ and an IR type filter passing only light having a wave length of about 800 m$\mu$ are alternately inserted into the light path of the illuminating fiber optical system. Since the absorption of light having wave lengths of 600 – 750 m$\mu$ by Hb is higher than the absorption by $HbO_2$ while the absorption of light having the a wave length of 800 m$\mu$ by Hb is substantially equal to that by $HbO_2$, the output of the photoelectric element, when the R type filter is used, indicates the quantity of Hb, while the output of the photoelectric element indicates the combined amount of Hb and $HbO_2$ when the IR type filter is used.

This method has the disadvantage that the forward ends of the illuminating and light receiving fiber optical systems may abut against the inner wall of the heart into which they are introduced so that the light emitted from the illuminating fiber optical system is not reflected by the blood but is reflected by the wall of the heart thereby making it impossible to obtain an accurate result.

The present invention aims at providing an optical measuring catheter which avoids the above described disadvantages of the prior art.

A further object is to provide a novel and useful optical measuring catheter by which the blood pressure of a living body as well as the variation in the blood pressure can be measured together with the degree of oxygen saturation in the blood.

BRIEF DESCRIPTION OF THE DRAWINGS

FIG. 5 is a schematic view partly in section showing a first embodiment of the present invention for measuring the degree of oxygen saturation in the blood;

FIG. 6 is a fragmentary perspective view showing a cone-shaped reflecting mirror incorporated in the embodiment of FIG. 5;

FIGS. 7 to 9 are perspective views of respective modifications of the reflecting mirror of FIG. 6;

FIG. 10 is a fragmentary side view showing the forward end portion of the embodiment of FIG. 5 inserted in a blood vessel of a living body;

FIG. 11 is a view similar to FIG. 5 but showing a modification of the embodiment of FIG. 5;

FIG. 12 is a fragmentary perspective view showing the cone-shaped reflecting mirror incorporated in the embodiment of FIG. 11;

FIGS. 13 to 15 are fragmentary perspective views each showing a modification of the reflecting mirror of FIG. 12;

FIG. 16 is a fragmentary side view showing the forward end portion of the embodiment of FIG. 11 inserted in a blood vessel of a living body;

FIG. 17 is a schematic view partly in section showing a further modification of the embodiment of FIG. 5;

FIG. 18 is a perspective view showing the cup-shaped blood transmitting member attached to the forward end of the embodiment of FIG. 17;

FIG. 19 is a sectional view showing a modification of the cup-shaped blood transmitting member of FIG. 18;

FIG. 20 is a schematic view partly in section showing a modification of the embodiment of FIG. 17;

FIG. 21 is a perspective view showing the cup-shaped blood transmitting member attached to the forward end of the embodiment of FIG. 20;

FIG. 22 is a longitudinal sectional view showing a second embodiment of the present invention by which the degree of oxygen saturation in the blood as well as the blood pressure and the variation thereof can be measured;

FIGS. 23 and 24 are fragmentary views showing the actuation of a diaphragm member incorporated in the embodiment of FIG. 22 under different blood pressures;

FIG. 25 is a front view of a filter interchanging disc incorporated in the embodiment of FIG. 22;

FIG. 26 is a longitudinal sectional view showing a modification of the embodiment of FIG. 22; and FIG. 27 is a fragmentary sectional view showing a modification of the forward end of the embodiment of FIG. 26.

Referring to FIG. 1, the ordinate indicates the absorption of light by $HbO_2$ and Hb while the abscissa indicates the wave length of the light. The absorption was measured by passing the light through 1 cm of a solution of Hb having a concentration of 16.7 gr/l. When light having wave lengths of 600 – 700 m$\mu$ is used, the absorption by Hb is very high in comparison with that by $HbO_2$, while the absorption of light having a wave length of about 800 m$\mu$ by Hb is substantially the same as that by $HbO_2$.

FIG. 2 shows the prior art earpiece system in which a light source 1 and a condenser 2 are located at one side of the lobe E and a photoelectric element 3 connected to a galvanometer G is located at the opposite side of the lobe E. An R type filter 4 adapted to transmit only light having a wave length of 600 – 750 m$\mu$ and an IR type filter 5 adapted to transmit only light having a wave length of 800 m$\mu$ are alternately inserted into the light path between the lobe E and the condenser 2. The elements 1, 2, 3, 4 and 5 are housed in a frame 6 for facilitating the handling of the device. The degree of oxygen saturation in the blood is obtained on the basis of the outputs read from the galvanometer G.

FIG. 3 shows the prior art device for measuring the degree of oxygen saturation n in the blood by using fiber optical systems. Referring to FIG. 3, an illuminating fiber optical system 17 and a light receiving fiber optical system 18 are arranged closely in parallel to each other in a sheath 19 with the forward ends 17a, 18a being flush with each other. A light source 11 and a condenser 12 are arranged at the rear end of the illuminating optical system 17. A photoelectric element 13 is attached to the rear end of the light receiving fiber optical system 18 and a galvanometer G is connected to the photoelectric element 13. An R type filter 14 and an IR type filter 15 are alternately inserted into the light path between the condenser 12 and the rear end of the illuminating fiber optical system 17.

Figure 1:
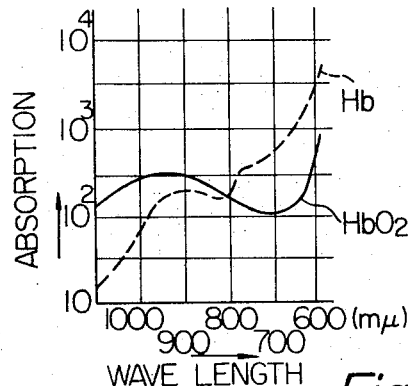
FIG. 1 is a diagram showing the absorption spectrum of the oxidized and the reduced hemoglobin.
Figure 2:
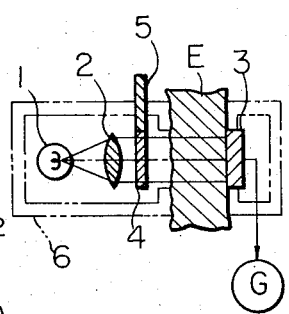
FIG. 2 is a schematic view partly in section showing the prior art earpiece system.
Figure 3:
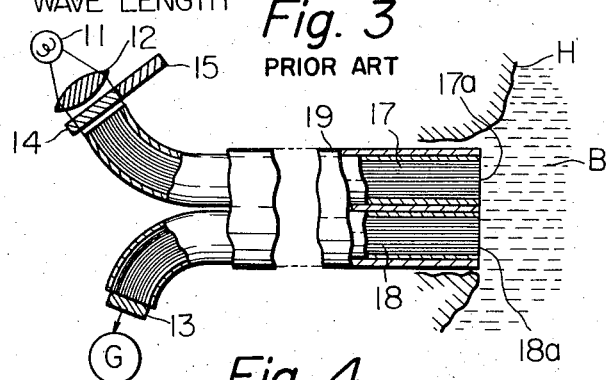
FIG. 3 is a schematic view partly in section showing the prior art method for measuring the saturation degree of oxygen in the blood by using fiber optical systems.
Figure 4:
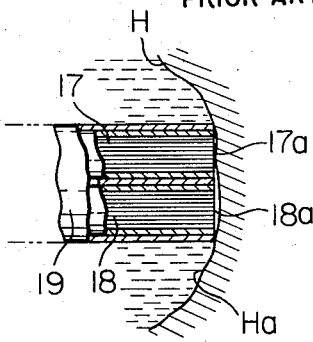
FIG. 4 is a fragmentary view showing the forward ends of the fiber optical system of FIG. 3 abutting against the wall of the heart

The forward ends 17a, 18a are inserted into the blood vessel or the heart H by the sheath 19. Therefore, the light emitted from the forward end 17a is reflected by the blood B and received by the forward end 18a, whereby energizing the photoelectric element 13 so as to actuate the galvanometer. The indication of the galvanometer G using the R type filter 14 and the IR type filter 15 is utilized to measure the degree of oxygen saturation in the blood as previously described. When the forward ends 17a, 18a abut against the wall Ha of the heart H, the light emitted from the forward end 17a of the illuminating fiber optical system 17 is reflected by the wall Ha itself (FIG. 4), thereby making the measurement inaccurate.

FIG. 5 shows a first embodiment of the optical measuring catheter of the present invention which avoids the above described disadvantage. Referring to FIG. 5, an illuminating fiber optical system 27 is arranged so as to closely surround a light receiving fiber optical system 28 and the forward ends 27a, 28a of the fiber optical systems 27, 28 are made flush with each other. Both the fiber optical systems 27, 28 are arranged in a sheath 29. A light source 21, a condenser 22, an R type filter 24 and an IR type filter 25 are arranged at the rear end 27b of the illuminating fiber optical system 27 which is separated from the light receiving fiber optical system 28, while a photoelectric element 23 connected to a galvanometer G is attached to the rear end 28b of the light receiving fiber optical system 28.

In accordance with one feature of the present invention, an annular supporting member 31 is attached to the periphery of the forward end 27a of the illuminating fiber optical system 27 and three forwardly extending supporting legs 31a, 31b and 31c are secured to the front surface of the member 31. The free ends of these legs 31a, 31b and 31c are attached to the bottom periphery of a cap-shaped guide or abutment member 31d (FIG. 6). A cone-shaped hollow reflecting mirror 30 made of a transparent material and having its inner surface 30a mirror finished is attached with its annular edge to the bottom periphery of the guide member 31d so that the mirror 30 is directed to the forward end 28a of the light receiving fiber optical system 28.

In operation, the forward ends 27a, 28a are first inserted into a blood vessel or the heart and the light source 21 is energized and the filter 24, 25 are alternately inserted into the light path of the light source 21. The light emitted from the forward end 27a is reflected by the mirror 30 toward the blood and again reflected thereby so as to be received and reflected by the mirror 30 to reach the forward end 28a of the light receiving fiber optical system 28 thereby permitting the measurement to be effected by the galvanometer G.

The cone-shaped reflecting mirror 30 may be replaced by a solid cone 40 or a solid pyramid 50 having a polygonal bottom as shown in FIGS. 7 and 8, respectively, or may be replaced by a pair of mirrors 61a, 61b arranged to form a V-shape as shown inn FIG. 9.

When the catheter shown in FIG. 5 is inserted into the blood vessel A and, one side surface of the catheter contacts the wall Aa of the blood vessel A as shown in FIG. 10, the light is positively reflected by the blood B at the opposite side of the catheter, thereby insuring an accurate measurement.

The catheter shown in FIG. 11 is substantially similar in construction to that shown in FIG. 5 except that the cone-shaped hollow reflecting mirror 130 having its inner surface 130a mirror finished is supported by a transparent smoothly finished cylindrical member 131 which is integral with the mirror 130 and is secured to the forward end of the sheath 29, so that the apex of the mirror 130 is directed to the forward end of the light receiving fiber optical system 28, the cap-shaped guide member 132 similar to the cap-shaped guide member 31d shown in FIG. 5 being secured to the forward end of the cylindrical member 131.

The operation of the catheter of FIG. 11 is similar to that shown in FIG. 5.

Since the cylindrical member 131 is formed by a transparent material having its surfaces smoothly finished, clotting on the surface is positively prevented, thereby insuring the accurate measurement.

The reflecting mirror 130 may be replaced by a solid cone 140 or a solid pyramid 150 as shown in FIGS. 13, 14 or by a solid cylindrical body 160 having reflecting surfaces 161 located at an angle to each other to form a V-shape as shown in FIG. 15.

As shown in FIG. 16, the light is positively reflected by the blood B even though one side of the cylindrical member 131 contacts the wall Aa of the blood vessel A.

FIG. 17 shows a further modification of the catheter shown in FIG. 5.

This catheter is substantially similar to that shown in FIG. 5 except that the reflecting mirror 30 of FIG. 5 is replaced by a hollow blood transmitting member 220 having its bottom edge secured to the forward end of the sheath 29.

The illuminating fiber optical system 28' is juxtaposed to the light receiving fiber optical system.

The blood transmitting member 220 has a cap-shaped top 220a and a blood introducing opening 220b and a blood discharging opening 220c.

The inner wall of the member 220 is black or mirror finished so that only the light reflected from the blood is received by the light receiving fiber optical system.

When the forward end of the sheath 29 is introduced into the heart H, only the top 220a is contacted by the wall Ha.

In operation, the light emitted from the forward end 27'a of the illuminating fiber optical system 27' is reflected by the blood $B_o$ introduced through the opening 220b into the space within the member 220 and is received by the forward end 28'a of the light receiving fiber optical system 28' so as to energize the photoelectric element 23 as in the case of the catheter shown in FIG. 5.

The blood transmitting member 220 may also be replaced by a solid cap-shaped transparent member 230 having a through-hole 230a as shown in FIG. 19.

FIG. 20 shows a modification of the catheter shown in FIG. 17. This catheter is substantially similar in construction to that shown in FIG. 17 except that, instead of the blood transmitting member 220 of FIG. 17, a hollow blood transmitting member 320 having a cap-shaped top 320a and a plurality of blood transmitting holes 320b 10 $\mu$ to 0.5 cm in size (FIG. 21) is attached to the forward end of the sheath 29, and a pipe 321 is provided along the fiber optical systems 27', 28' with its forward end opening in the space within the member 320 and with its rearward end connected to a pumping syringe 322.

The syringe contains physiological sodium chloride solution so that an accident due to air introduced into the blood vessel is prevented.

In operation, the forward end portions 27'a, 28'a are introduced into the heart H and blood B is drawn through the holes 320b into the space within the member 320 by means of the syringe 322.

Referring to FIG. 22, a flexible cover tube 403 houses therein the illuminating fiber optical system 27' and the light receiving fiber optical system 28' which are similar to those previously described. The rear end of tube 403 has a branch tube 403b housing therein the rear end of the illuminating fiber optcial system 27', a light source 21 having a reflector 21a and 1 condenser 22 while a branch tube 403a houses therein the rear end of the light receiving fiber optical system 28' to which the photoelectric element 23 connected to the galvanometer G is attached.

A spacer ring 408 is attached to the periphery of the forward end of the cover tube 403, and a transparent elastic thin diaphragm phragm or film 409 made of a synthetic resin material such as polyurethane, polyester or silicone resin is secured with its peripheral portion to the periphery of the ring 408 so that the diaphragm 409 spacedly seals the forward ends of the illuminating and light receiving fiber optical systems 27', 28' against the exterior.

A coating of $MgF_2$, $SeO_2$ or $Na_2AlF_3$ on the inner surface 409a of the diaphragm 409 causes light having a wave length less than about 650 m$\mu$, to be reflected, but light having wave lengths greater than about 600 m$\mu$ to be transmitted through the diaphragm 409.

A filter interchanging disc 410 is manually rotatably mounted on a shaft 413 between the rear end of the illuminating fiber optical system 27' and the condenser 22 as shown in FIG. 22. The disc 410 supports an R type filter 404 an IR type filter 411 and a filter 412 which intercepts light having wave lengths greater than 650 m$\mu$ as shown in FIG. 25.

In operation, the forward ends of the fiber optical systems 27', 28' are first inserted into the heart or the blood vessel or other organ to be inspected so that the outer surface of the diaphragm 409 is held in contact with the blood, and the light source 21 is energized. By alternately using the filters 404 and 411, the degree of oxygen saturation in the blood is determined as described previously.

When the filter 412 is located in the light path of the light source 21, the light emitted from the forward end of the illuminating fiber optical system 27' is reflected by the inner surface 409a of the diaphragm 409 so as to be received by the forward end of the light receiving fiber optical system 28' as indicated by c and d in FIG. 22.

Since the diaphragm 409 is elastic, it is convex or concave as shown in FIG. 23 and 24 in somewhat exaggerated manner depending upon the pressure of the blood. If the blood pressure is high and the diaphragm 409 is depressed as shown in FIG. 23, the quantity of light received by the optical system 28' is reduced. When the blood pressure is low and the diaphragm 409 is inflated as shown in FIG. 24, the light received by the forward end of the light receiving fiber optical system 28' is increased. Thus, the blood pressure and any variation in the blood pressure in the heart or the blood vessel can be determined.

It is apparent that an amplifier may be provided between the photoelectric element 23 and the galvanometer G, or an electromagnetic recording device or other suitable means may be replaced for the galvanometer so as to permit the measured data to be recorded.

The catheter shown in FIG. 26 is substantially similar to that shown in FIG. 22 except that a semitransparent mirror 514 adapted to transmit only light having wave lengths of less than about 650 m$\mu$ but to reflect light filtered by the R type filter and the IR type filter previously described is arranged between the diaphragm 409 and the forward ends 27'a, 28'a of the illuminating and light receiving fiber optical systems 27', 28' at an angle with respect to the light path thereof so that the light transmitted through the semitransparent mirror 414 is used in the measurement of the blood pressure while the light reflected by the semitransparent mirror 514 is used in the measurement of the degree of oxygen saturation in the blood.

Referring to FIG. 26, a spacer tube 511 having a window 511a in the side wall thereof is mounted on the forward end of the cover tube 403 and the diaphragm 409 is secured to the forward end of the tube 511 in like manner as shown in FIG. 22. A pair of prisms 514a and 514b cemented to each other so as to provide the above described semitransparent mirror 514 are so supported in the tube 511 that the light emitted from the forward end of the illuminating fiber optical system 27' and reflected by the mirror 514 is directed through the window 511a, while the light transmitted through the mirror 514 is directed to the diaphragm 409.

In operation, the degree of oxygen saturation in the blood is measured by alternately using the filters 404, 411 while the blood pressure is measured by using the filter 412 so as to transmit the light through the mirror 514 toward the diaphragm 409.

The embodiment shown in FIG. 26 is advantageous in that reflection of the light by diaphragm 409 during the measurement of the oxygen saturation is completely avoided.

FIG. 27 shows a modification of the arrangement of the prisms 514a, 514b. In this case, the prisms 514a, 514b are supported directly by the forward end portion of the cover tube 403 extending beyond the forward ends 27'a, 28'a of the fiber optical systems 27', 28' and the diaphragm 409 is supported directly by the prisms 514a, 514b. The operation is similar to that of the embodiment of FIG. 26.

I claim:

1. In an optical measuring catheter including an illuminating fiber optical system, a light receiving fiber optical system closely juxtaposed to said illuminating fiber optical system, said systems having respective forward ends juxtaposed in flush relationship and adapted to be inserted into an organ of a living body containing flowing blood and respective rear ends, light supplying means for supplying to the rear end of said illuminating fiber optical system light having wavelengths of about 600 to 750 m$\mu$ and of about 800 m$\mu$, whereby the supplied light is emitted from the forward end of said illuminating fiber optical system and partly transmitted from the forward end of said light receiving fiber optical system to the rear end of the latter system, a photoelectric element positioned to receive said transmitted light and generating an output signal in response to the received light, detecting means connected to said element for indicating said output signal, and a transparent abutment secured to said forward ends for preventing said forward ends from contacting directly an inner wall of said organ while permitting passage of said light, the improvement which comprises:

said abutment means including a transparent, elastic diaphragm, securing means spacedly securing said diaphragm in front of said forward ends, said securing means, said diaphragm, and said forward ends bounding a sealed space, a coating on the surface of said diaphragm in said space, said coating reflecting light of a wave length of less than about 650 m$\mu$ while transmitting light of greater wave length, said light supplying means including means for supplying light having a wave length of less than about 650 m$\mu$, whereby the amount of light of said last-mentioned wave length received by said forward end of said light receiving fiber optical system varies in response to ambient pressure and the resulting curvature of said diaphragm.

2. In an optical measuring catheter including an illuminating fiber optical systems, a light receiving fiber optical system closely juxtaposed to said illuminating fiber optical system, said systems having respective forward ends juxtaposed in flush relationship and adapted to be inserted into an organ of a living body containing flowing blood and respective rear ends, light supplying means for supplying to the rear end of said illuminating fiber optical system light having wavelengths of about 600 to 750 m$\mu$ and of about 800 m$\mu$, whereby the supplied light is emitted from the forward end of said illuminating fiber optical system and partly transmitted from the forward end of said light receiving fiber optical system to the rear end of the latter system, a photoelectric element positioned to receive said transmitted light and generating an output signal in response to the received light, detecting means connected to said element for indicating said output signal, and a transparent abutment secured to said forward ends for preventing said forward ends from contacting directly an inner wall of said organ while permitting passage of said light, the improvement which comprises:

said abutment including an elastic diaphragm having a reflecting surface directed toward said forward ends and bounding a sealed space, and a semitransparent mirror located between said space and said forward ends, said mirror transmitting light having a wave length of less than about 650 m$\mu$ but reflecting light of greater wave length outward of said catheter and angularly away from said diaphragm, said light supplying means including means for supplying light of said wave length of less than about 650 m$\mu$, whereby the amount of light of said last-mentioned wave length received by said forward end of said light receiving fiber optical system varies in response to ambient pressure and the resulting curvature of said diaphragm.

* * * * *